United States Patent [19]

Hoonsbeen

[11] Patent Number: 4,878,073

[45] Date of Patent: Oct. 31, 1989

[54] TRANSPARENT SLIDE PROTECTIVE CONTAINER

[75] Inventor: Gary A. Hoonsbeen, Minneapolis, Minn.

[73] Assignee: Image Innovations, Inc., Edina, Minn.

[21] Appl. No.: 226,856

[22] Filed: Aug. 1, 1988

[51] Int. Cl.$^4$ ............................................. G03B 21/64
[52] U.S. Cl. ..................................... 353/120; 353/122; 40/159
[58] Field of Search ............ 353/120, 121, 122, 15–19; 360/2; 40/158 B, 159, 661

[56] References Cited

U.S. PATENT DOCUMENTS

| | | | |
|---|---|---|---|
| 3,155,236 | 11/1964 | Reno | 40/159 X |
| 3,297,398 | 1/1967 | Donofrio | 353/120 |
| 3,876,297 | 4/1975 | Appledorn | 353/120 X |
| 4,144,664 | 3/1979 | Korte | 40/661 X |

FOREIGN PATENT DOCUMENTS 0666510  6/1979  U.S.S.R. .............................. 353/120

Primary Examiner—Harry N. Haroian
Attorney, Agent, or Firm—John W. Adams

[57] ABSTRACT

A protective container for transparent slides which includes one or more informational strips on the outside thereof to identify the information carried or illustrated by the slide.

4 Claims, 1 Drawing Sheet

TRANSPARENT SLIDE PROTECTIVE CONTAINER

BACKGROUND OF THE INVENTION

1. Field of the Invention

This invention relates to a transparent protective rigid container for photographic projector slides which may include a human readable printed informational strip applied to the container as well as a machine readable encoded informational strip thereon and constructed to standardize the size of each slide and container assembly while facilitating access to both visual and machine readable identifying information with respect to the slide which is protectively enclosed within the container.

2. Description of the Prior Art

The only prior art relating to slide containers with which the inventor herein is familiar is a flexible transparent thin sheet plastic slide envelope in which a slide may be enclosed if desired.

Also it should be pointed out that suitable encoding and read-write circuitry for machine readable slide identification purposes is disclosed in co-pending U.S. patent application Ser. No. 866,214 filed May 22, 1986, now U.S. Pat. No. 4,765,734 entitled INFORMATION ENCODED PROJECTOR SLIDE AND SYSTEMS FOR USING THE SAME. That invention and application is assigned to Pakon, Inc. an Indiana Corporation having offices at 6121 Baker Road, Minnetonka, Minn. 55345. The present inventor Gary A. Hoonsbeen and James A. Truc are joint inventors in that application.

SUMMARY OF THE INVENTION

The present invention provides a transparent rigid plastic container or holder into which a photographic slide may be inserted to not only enclose and protect the slide but also standardize the outside dimensions of the packaged slide for efficient storage, sorting and handling purposes even though the dimensions of the actual photographic slides may vary from slide to slide. The container may also include two informational strips, one with human readable printed information thereon and the other strip containing machine readable information encoded thereon.

DETAILED DESCRIPTION OF THE PREFERRED EMBODIMENT

Figure 1:
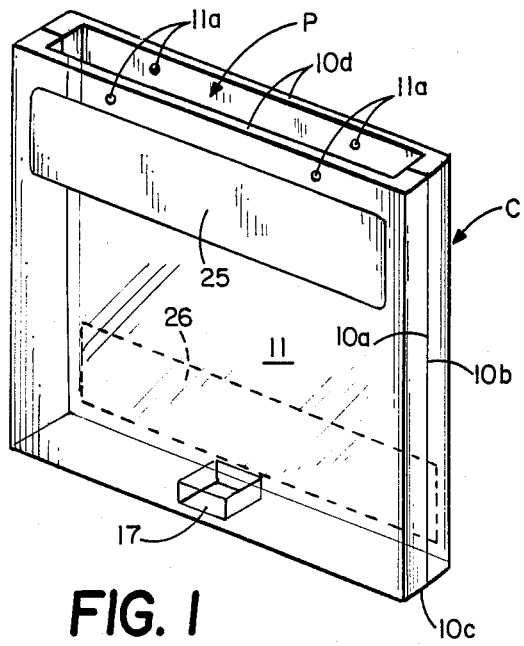
FIG. 1 is a perspective view of a container embodying this invention.

As illustrated a container C embodying this invention, is made from two transparent rigid plastic sections 10 joined together by suitable means as by being bonded or glued. The container provides a receptacle which defines a pocket into which a photographic slide can be inserted for protection during storage and sorting. The sections 10 have transparent side panels 11 with mating side edges 10a and 10b, a bottom edge 10c, and a top edge 10d. The side panels 11 are spaced apart a distance slightly greater than the thickness of a photographic slide to form a slide receiving pocket P therebetween. The two sections 10 may be provided with interlocking positioning elements such as tongue and groove elements 16 formed on oposite edges 10a and 10b of the mating sections 10 as respectively illustrated in FIG. 2.

Figure 2:
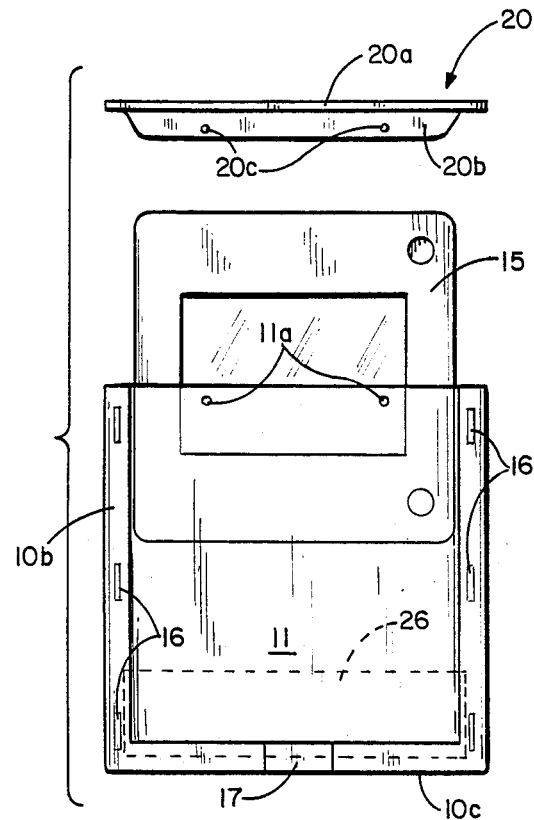
FIG. 2 is a front view of the container with the cover shown in removed position and a slide partially inserted therein.

A color coded top cover insert 20 is illustrated in FIG. 2 and is generally T-shaped in cross section having a top sealing flange 20a and a depending tongue element 20b which has a snap-fit connection with the top marginal edges of the container C. This snap-fit connection may be provided by a pair of spaced tits 20c on tongue 20b which are received in spaced holes 11a at the top of side panels 11. The bottom has an opening 17 formed therein.

The present container C is also adapted to permit the use of information retrieval strips 25 and 26 which may be attached to selected portions of the outside of the panels 11 of the container. In the form shown, the strip 25 is designed to carry visual readable information and the strip 26 may be machine readable such as by means of a magnetic read head 36 or a bar code scanner (not shown). The machine readable strip 26 may be encoded by conventional bar code apparatus (not shown) instead of the magnetic write/read apparatus disclosed above.

Figure 3:
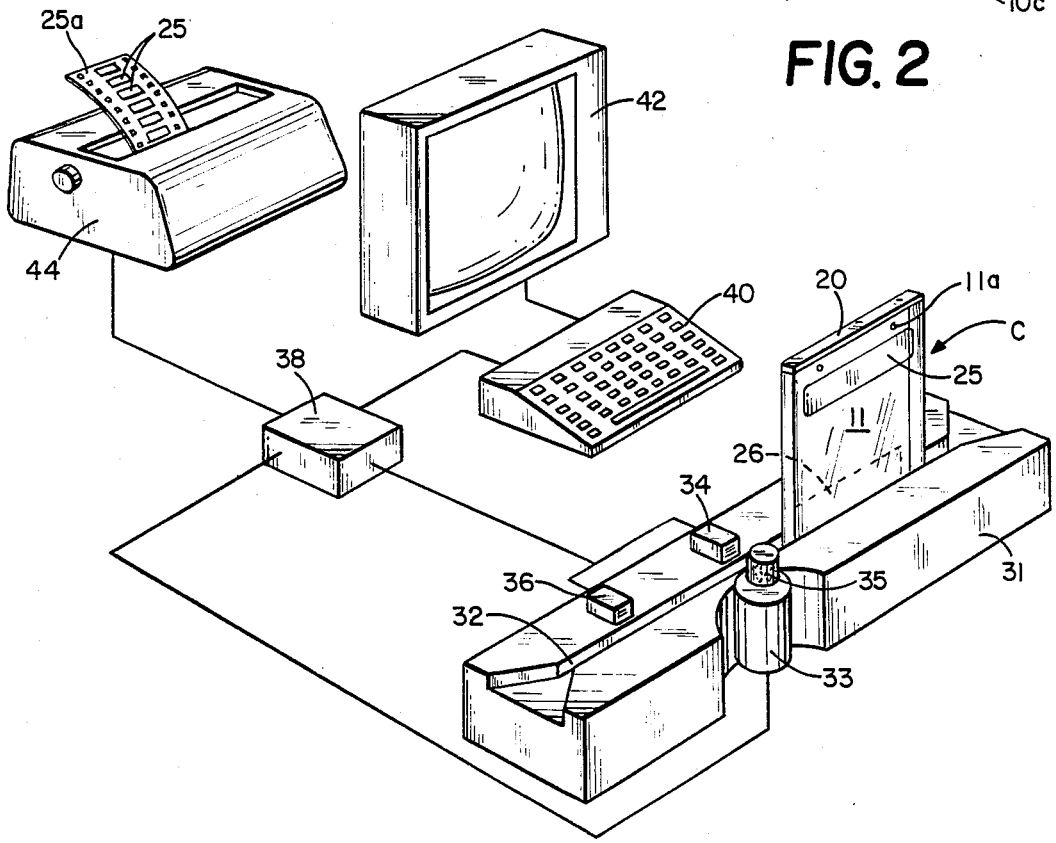
FIG. 3 is a diagrammatic view of the system for electronically encoding, reading, and printing machine and visually readable information for the container.

A read/write system 30 may be provided such as the read/write system 30 disclosed in co-pending application Ser. No. 866,214 filed May 22, 1986 previously identified herein. This system is illustrated in the schematic diagram of FIG. 3. A carriage 31 for receiving container C includes a slot track 32. The bottom 10c of the container is positioned in slot 32. In FIG. 3, front surface of container C is shown. Magnetic medium such as strip 26 may be applied to the opposite side (not shown) of the container C. A first or write head 34 is mounted on carriage 31 so that head 34 can be in contact with or very closely spaced from magnetic medium 26 of the container C. A read head 36 is mounted on carriage 31 so that head 36 can be in contact with or very closely spaced from magnetic medium 26 on the container C.

As magnetic medium 26 passes the read/write heads 36 and 34, data can be encoded thereon and read therefrom. Read and write heads 36 and 34 are magnetic pickup heads and are interfaced with read electronic circuitry 38. Read/write system 30 also includes a tachometer counter 33 which is interfaced to circuitry 38. As the container C with a slide 15 therein passes by write head 34, roller 35 contacts strip 26 and data representative of the speed at which container C is moving is provided to circuitry 38. This speed data is utilized by circuitry 38 to properly write data onto magnetic medium 26. Circuitry 38 is interfaced with a keyboard 40 and a data display monitor 42. It will be understood that carriage 31, write and read heads 34 and 36, electronic circuitry 38, keyboard 40 and display monitor 42 can be packaged into an integral housing (not shown) as desired.

In operation, information to be encoded or written onto magnetic medium 26 on container C is typed on keyboard 40 and simultaneously displayed on monitor 42. Selected information can be entered onto predetermined fields (not shown). Each field has a selected length. The sum of all fields equals the storage capacity of magnetic medium 26.

Once information is displayed on monitor 42, container C is positioned in slot 32. As magnetic medium 26 passes in contact with write head 34, the information is digitally encoded thereon. The container C continues through slot 32 so that medium 26 makes contact with read head 36. Read head 36 detects the encoded information.

It is preferred that system 30 include a verification system. Memory within circuitry 38 (not shown) compares the encoded information written on strip 26 with information read by read head 36 to assure that it was properly encoded. A signal, such as a single audio beep, can issue from system 30 to indicate conformation. An indication such as a visual display provided through monitor 42 can issue to indicate an improper write operation. Additional passes through slot 32 are made until the information is properly encoded or written onto machine readable strip 26. Read head 36 also permits system 30 to detect previously encoded informatiton, and display this information on monitor 42. Furthermore, previously encoded data on medium 26 can also be erased and replaced with new data. The data produced by an operator at the keyboard 40 may be typed onto visually readable strips 25 by means of a printer 44 connected with the electronic circuitry 38 and controlled by the keyboard operator. The blank strips 25 are conveniently provided with pressure sensitive adhesive and are originally mounted on a tractor feed backing 25a which is fed through the mechanism of the printer 44. The encoding process for the machine readable strip 26 may be carried out contemporaneously with the preparation of the visually readable strip 25 or it may be produced at a different time. In the event that a machine readable medium 26 is not required the write and read head mechanism need not be used and only the visually readable strips 25 would be produced for application to the container for visually identifying the slides packaged therein. It will be apparent that different information could be encoded on the visually readable strip 25 from the machine readable strip 26, such as confidential information in a doctor's or lawyer's office, for example.

It will be seen that this invention provides a very versatile container which will not only protect the transparent slides, but will also provide a means for not only visually reading a description of the material on the slides and for appropriately indexing the slide within the container for storage purposes but also a machine encoded information strip which can only be read by an appropriate reading apparatus.

What is claimed is:

1. A container for individual photographic slides, said container comprising a pair of spaced apart transparent semi-rigid plastic side panels defining an open top but positively connected along at least the side edges thereof to define a slide receiving pocket therebetween, a removable cover closing said open top with means for releasably holding the top in closed position to close the top of said pocket, said cover having a generally T-shaped cross-section with a depending tongue portion, said tongue portion being received in the open top with interfitting means formed along the upper marginal edge of at least one of the side panels and said tongue portion to hold the top in closed position.

2. A container for individual photographic slides, said container comprising a pair of spaced apart transparent semi-rigid plastic side panels defining an open top but positively connected along at least the side edges thereof to define a slide receiving pocket therebetween, a removable cover closing said open top with means for releasably holding the top in closed position to close the top of said pocket, and an information strip attached to the outside of the container in close parallel association to one edge of the container with encoding means for encoding information on said strip.

3. The structure set forth in claim 2 and said information strip including a magnetic medium and a magnetic encoding head mounted for association with said magnetic strip for digitally encoding alphanumeric information on said strip.

4. The structure set forth in claim 2 and a printer connected with said encoding means to produce a visually readable strip attachable to the outside of said container to permit the information encoded on the magnetically readable strip to be visually identified.

* * * * *